United States Patent
Livescu et al.

(10) Patent No.: US 8,037,330 B2
(45) Date of Patent: Oct. 11, 2011

(54) NON-IDENTICAL POWER SUPPLY UNITS FOR HIGHER EFFICIENCY IN REDUNDANT MODE

(75) Inventors: Constantin D. Livescu, Austin, TX (US); Abey K. Mathew, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 707 days.

(21) Appl. No.: 12/098,784

(22) Filed: Apr. 7, 2008

(65) Prior Publication Data

US 2009/0254768 A1    Oct. 8, 2009

(51) Int. Cl.
G06F 1/26 (2006.01)
G06F 1/32 (2006.01)

(52) U.S. Cl. .................................... 713/320; 323/282

(58) Field of Classification Search .............. 713/300, 713/310, 320, 322, 340; 323/280, 282, 266
See application file for complete search history.

(56) References Cited

U.S. PATENT DOCUMENTS

| | | | |
|---|---|---|---|
| 6,040,982 A | 3/2000 | Gandre et al. | |
| 6,091,617 A | 7/2000 | Moran | |
| 6,208,520 B1 | 3/2001 | Schmitt | |
| 6,404,077 B1 | 6/2002 | Moran | |
| 6,651,178 B1* | 11/2003 | Voegeli et al. | 713/300 |
| 6,841,898 B2 | 1/2005 | Moran | |
| 7,127,542 B2 | 10/2006 | Parameswaran | |
| 7,323,794 B2* | 1/2008 | Gentillet et al. | 307/35 |
| 7,337,333 B2 | 2/2008 | O'Conner et al. | |
| 2001/0007134 A1* | 7/2001 | Odaohhara | 713/300 |
| 2008/0164765 A1* | 7/2008 | Illegems | 307/80 |
| 2008/0224675 A1* | 9/2008 | Takagi | 323/275 |
| 2009/0094469 A1* | 4/2009 | Kitamrua | 713/320 |
| 2009/0172453 A1* | 7/2009 | Dishman et al. | 713/340 |

* cited by examiner

Primary Examiner — Thomas Lee
Assistant Examiner — Xuxing Chen
(74) Attorney, Agent, or Firm — Larson Newman, LLP

(57) ABSTRACT

A power supply system for a server includes a first power supply, a second power supply, a first variable slope circuit, and a second variable slope circuit. The first power supply unit is adapted to activate if a load is below a predetermined level, and adapted to deactivate if the load is above the predetermined level. The second power supply unit is adapted to activate if the load is above the predetermined level, and adapted to deactivate if the load is below the predetermined level. The first and second variable slope circuits are adapted to receive information about the load applied to the power supply units. The first variable slope circuit is adapted to deactivate the first power supply unit if the load is above the predetermined level. The second variable slope circuit is to deactivate the second power supply unit if the load is below the predetermined level.

17 Claims, 5 Drawing Sheets

NON-IDENTICAL POWER SUPPLY UNITS FOR HIGHER EFFICIENCY IN REDUNDANT MODE

FIELD OF THE DISCLOSURE

This disclosure relates generally to information handling systems, and more particularly to power supply units in information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Typically, a server rack has two power supply units arranged in a redundant mode configuration to provide power to components connected to the server rack. The redundant mode configuration allows the components of the server rack to continually receive power even if one of the power supply units fails because the other power supply unit is capable of carrying the entire load of the server rack. Usually, the power supply units have identical power and efficiency characteristics, such that the efficiency of the both of the power supply units are the same when the same load is applied to the power supply units. Traditionally, these power supply units are designed and optimized for best efficiency at higher loads and lesser efficiency at lighter loads.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
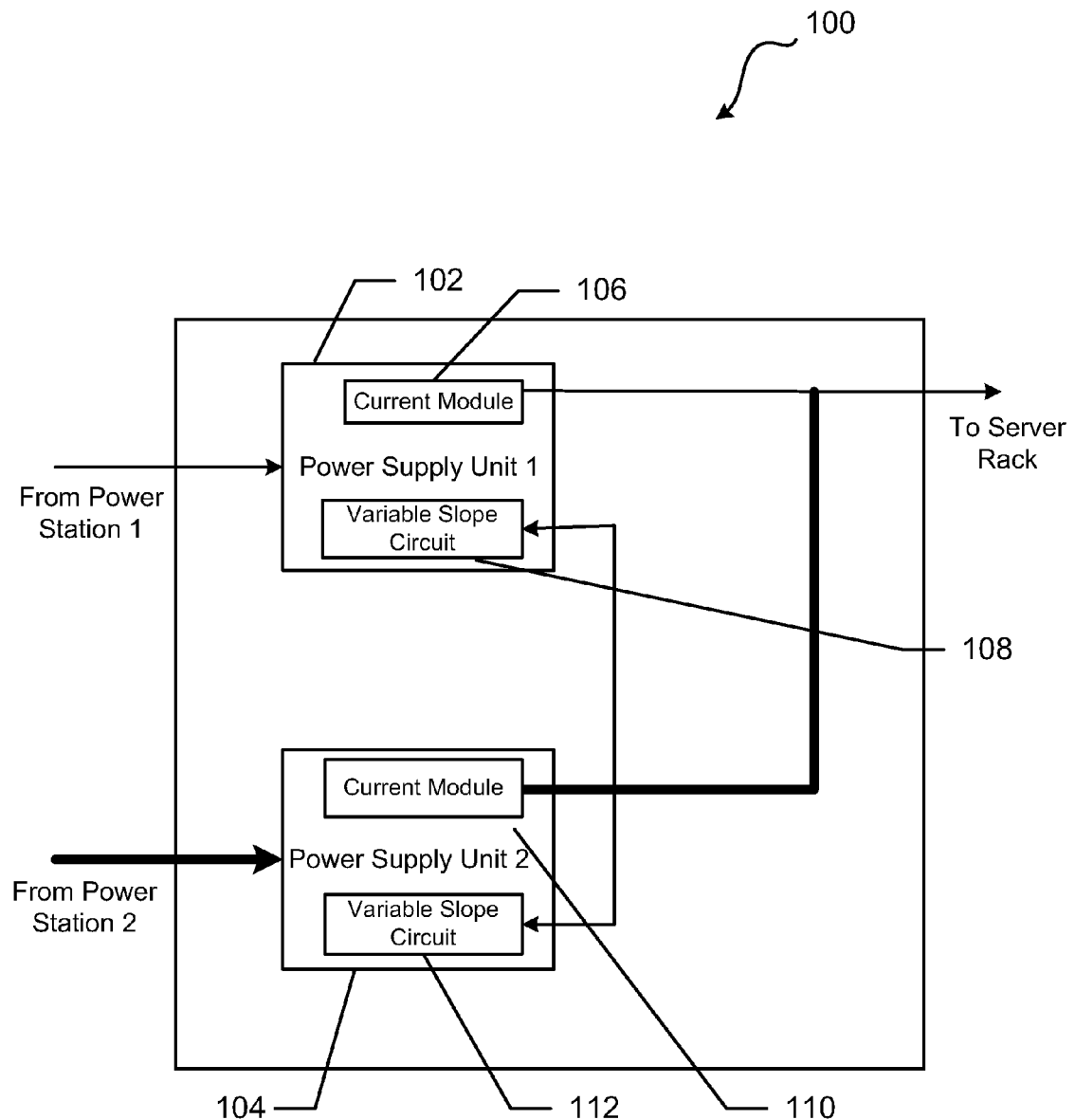
FIG. 1 is a block diagram of an embodiment of a power supply system.

FIG. 1 shows an embodiment of a power supply system 100 including a first power supply unit 102 and a second power supply unit 104. The first power supply unit 102 includes a current module 106, a variable slope circuit 108, an input terminal, and an output terminal. The second power supply unit 104 includes a current module 110, a variable slope circuit 112, an input terminal, and an output terminal. The current module 106 is in communication with the output terminal of the first power supply unit 102 and the variable slope circuit 108. The current module 110 is in communication with the output terminal of the second power supply unit 104 and the variable slope circuit 112. The input terminal of the first power supply unit 102 is connected to an alternating current (AC) input voltage and the output terminal of the first power supply unit is connected to a direct current (DC) output terminal of the power supply system 100. Additionally, the input terminal of the second power supply unit 104 is connected to an AC input voltage and the output terminal of the second power supply unit is connected to the DC output terminal of the power supply system 100. The input terminals of the first power supply unit 102 and the second power supply unit 104 can be connected to different AC voltage supplies, and the power supply units can be connected in a redundant mode configuration. Thus, the power supply system 100 can continuously provide power even if one of the power supply units fails.

The power supply units 102 and 104 convert the AC input voltages into DC output voltages, and provide the DC output voltages to multiple electronic components, such as components in a server rack. As the components of the server rack pull current from the first power supply unit 102, the current module 106 can measure the amount of current drawn by the server rack and determine whether the load is a light or high load. Similarly, as the server rack pulls current from the second power supply unit 104, the current module 110 can measure the amount of current drawn by the server rack and determine whether the load is a light or high load. Based on the number of components within the server rack pulling current from power supply system 100, the load can continuously change from a light load to a high load and back to a light load.

The variable slope circuit 108 can receive information about the amount of load applied to the first power supply unit 102 from the current module 106. Based on the load applied to the first power supply unit 102, the variable slope circuit 108 can control whether the first power supply unit is turned on or off. Additionally, the variable slope circuit 112 can receive the amount of load applied to the second power supply unit 104 from the current module 110. Based on the load applied to the second power supply unit 104, the variable slope circuit 112 can control whether the second power supply unit is turned on or off. The variable slope circuits 108 and 112 can be connected together, so that only either the first power supply unit 102 or the second power supply unit 104 is turned on at one time. Thus, the power supply units 102 and 104 can be turned on and off at different times so that one of the power supply units can be forced to carry the entire of the load of the power supply system 100.

The first power supply unit 102 and the second power supply unit 104 can have different power efficiency profiles, such that one of the power supplies has a higher efficiency at light loads and the other power supply has a higher efficiency at high loads. For example, the first power supply unit 102 can have a high efficiency at light loads and a low efficiency at high loads and the second power supply 104 can have a low efficiency at light loads and a high efficiency at high loads. Thus, to maximize the efficiency of the power supply system 100, the first power supply unit 102 can provide power to the server rack at light loads, and the second power supply unit 104 can provide power to the server rack at high loads. The variable slope circuit 108 can activate the first power supply unit at light loads and deactivate the first power supply unit at high loads, and the variable slope circuit 112 can activate the second power supply unit at high loads and deactivate the second power supply unit at light loads. Therefore, the overall power supply system 100 has a high efficiency for all loads.

Figure 2:
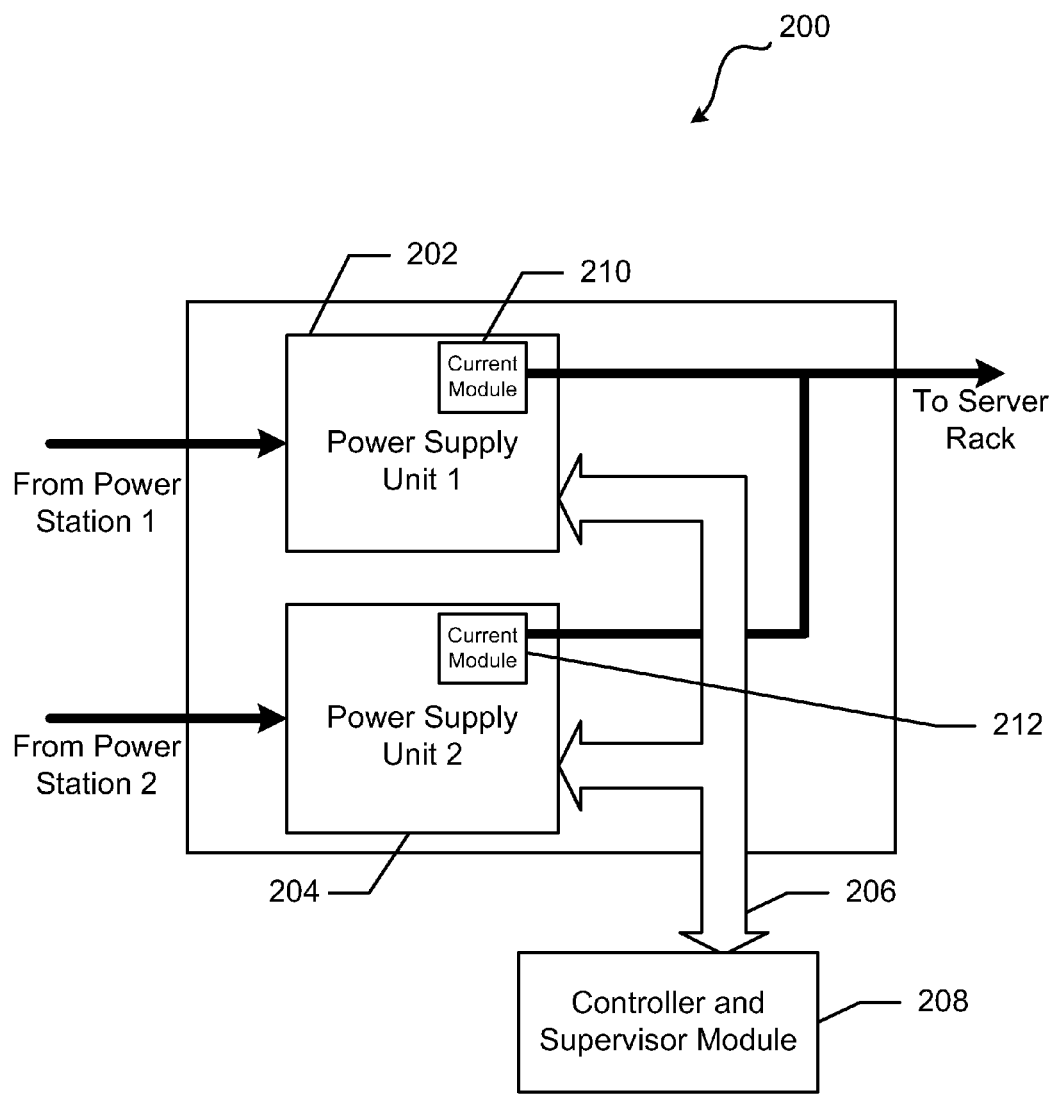
FIG. 2 is a block diagram of an alternative embodiment of the power supply system.

FIG. 2 shows an alternative embodiment 200 of a power supply system including a first power supply unit 202, a second power supply unit 204, a power management bus (PMBus) 206, and a controller and supervisor module 208. The first power supply unit 202 includes a current module 210, an input terminal, and an output terminal. The second power supply unit 204 includes a current module 212, an input terminal, and an output terminal. The input terminal of the first power supply unit 202 is connected to an AC input voltage and the output terminal is connected to a DC output terminal of the power supply system 200. Additionally, the input terminal of the second power supply unit 204 is connected to an AC input voltage and the output terminal is connected to the DC output terminal of the power supply system 200. The input terminals of the first power supply unit 202 and the second power supply unit 204 can be connected to different AC input voltages, and the power supplies can be connected in a redundant mode configuration. The controller and supervisor module 208 is in communication with the first power supply unit 202 and the second power supply unit 204 through the PMBus 206.

The first power supply unit 202 and the second power supply unit 204 can have different power efficiency profiles, such that one of the power supply units has a higher efficiency at high loads and the other power supply has a higher efficiency at light loads. For example, the first power supply unit 202 can have a high efficiency at light loads and a low efficiency at high loads, and the second power supply 204 can have a low efficiency at light loads and a high efficiency at high loads. Thus, to maximize the efficiency of the power supply system 200, the first power supply unit 202 can provide power to the server rack at light loads, and the second power supply unit 204 can provide power to the server rack at high loads. The current modules 210 and 212 can measure the amount of current being drawn by the load of the power supply units 202 and 204, to determine the amount of load on the power supply system 200. The controller and supervisor module 208 can receive information associated with the power supply units 202 and 204, and send control signals to the power supply units. The information associated with the power supply units 202 and 204 can include the current load on the power supply units, whether the power supply units are activated or deactivated, and the like. The control signals can cause the power supply units 202 and 204 to turn on and off.

The current modules 210 and 212 can determine the amount of current being drawn by a load, such as the components of the server rack. The amount of current can be used to determine whether the load is light or high, and the level of the load can be transmitted over the PMBus 206 to the controller and supervisor module 208. If the load is light, the controller and supervisor module 208 can transmit a control signal to activate the first power supply unit 202. Upon receiving a return signal that the first power supply unit 202 is completely activated, the controller and supervisor module 208 can send a control signal to deactivate the second power supply unit 204. However, if the load is high, the controller and supervisor module 208 can transmit a control signal to activate the second power supply unit 204. Upon receiving a return signal that the second power supply unit 204 is completely activated, the controller and supervisor module 208 can send a control signal to deactivate the first power supply unit 202. To ensure that the power supply system 200 continuously provides power to the server rack, the controller and supervisor module 208 can determine that the proper power supply unit for the current load is completely activated before deactivating the other power supply unit.

Figure 3:
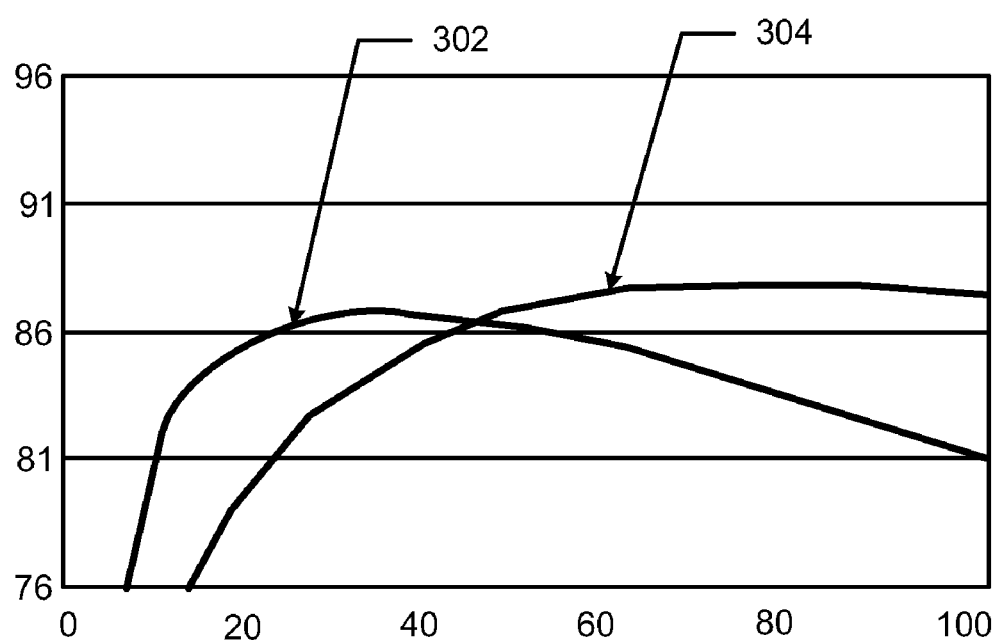
FIG. 3 is a graph of a plurality of waveforms associated with the power supply system.

FIG. 3 shows a particular embodiment of a plurality of waveforms 302 and 304 associated with the power supply system 100 of FIG. 1 and the power supply system 200 FIG. 2. The waveform 302 represents the efficiency of the first power supply unit for different load percentages up the maximum load of the power supply system. The waveform 304 represents the efficiency of the second power supply unit for different load percentages up the maximum load of the power supply system. Waveform 302 shows that the first power supply unit has a higher efficiency at light loads and a lower efficiency at high loads. Waveform 304 shows that the second power supply unit has a lower efficiency at light loads and a higher efficiency at high loads.

Figure 4:
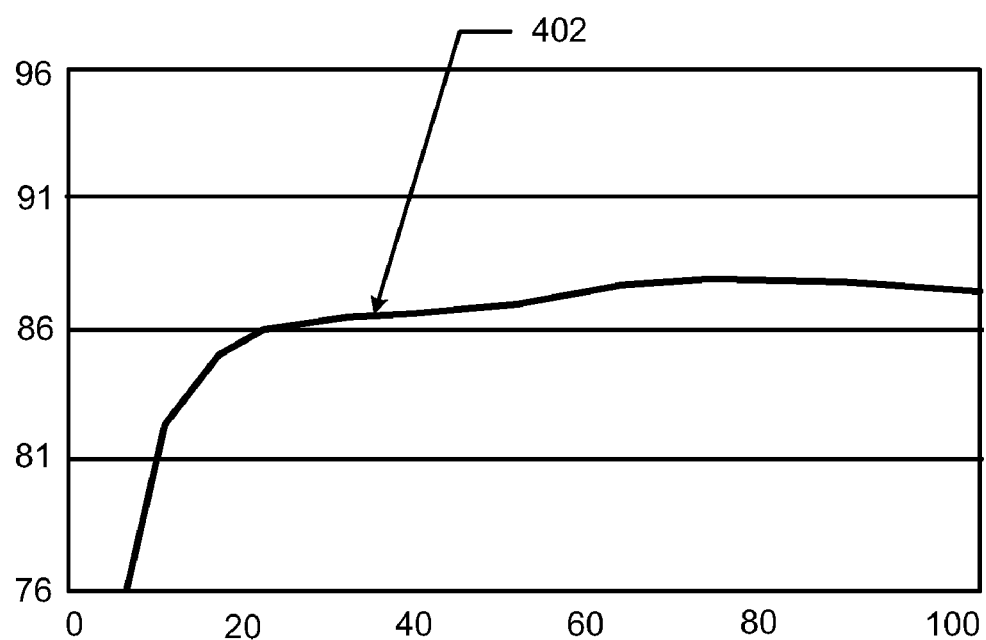
FIG. 4 is a graph of an alternative waveform associated with the power supply system.

FIG. 4 shows a particular embodiment of a 402 associated with the power supply system 100 of FIG. 1 and the power supply system 200 FIG. 2. The waveform 402 represents the efficiency of the overall power supply system for different load percentages up the maximum load of the power supply system. The power supply system efficiency waveform 402 follows the first power supply unit efficiency and the second power supply unit efficiency, such that the first power supply unit carries the load at light loads and the second power supply unit carries the load at heavy loads. Thus, waveform 402 shows that the power supply system has a high efficiency for all loads, because the first power supply unit is used at light loads and the second power supply unit is used at high loads.

Figure 5:
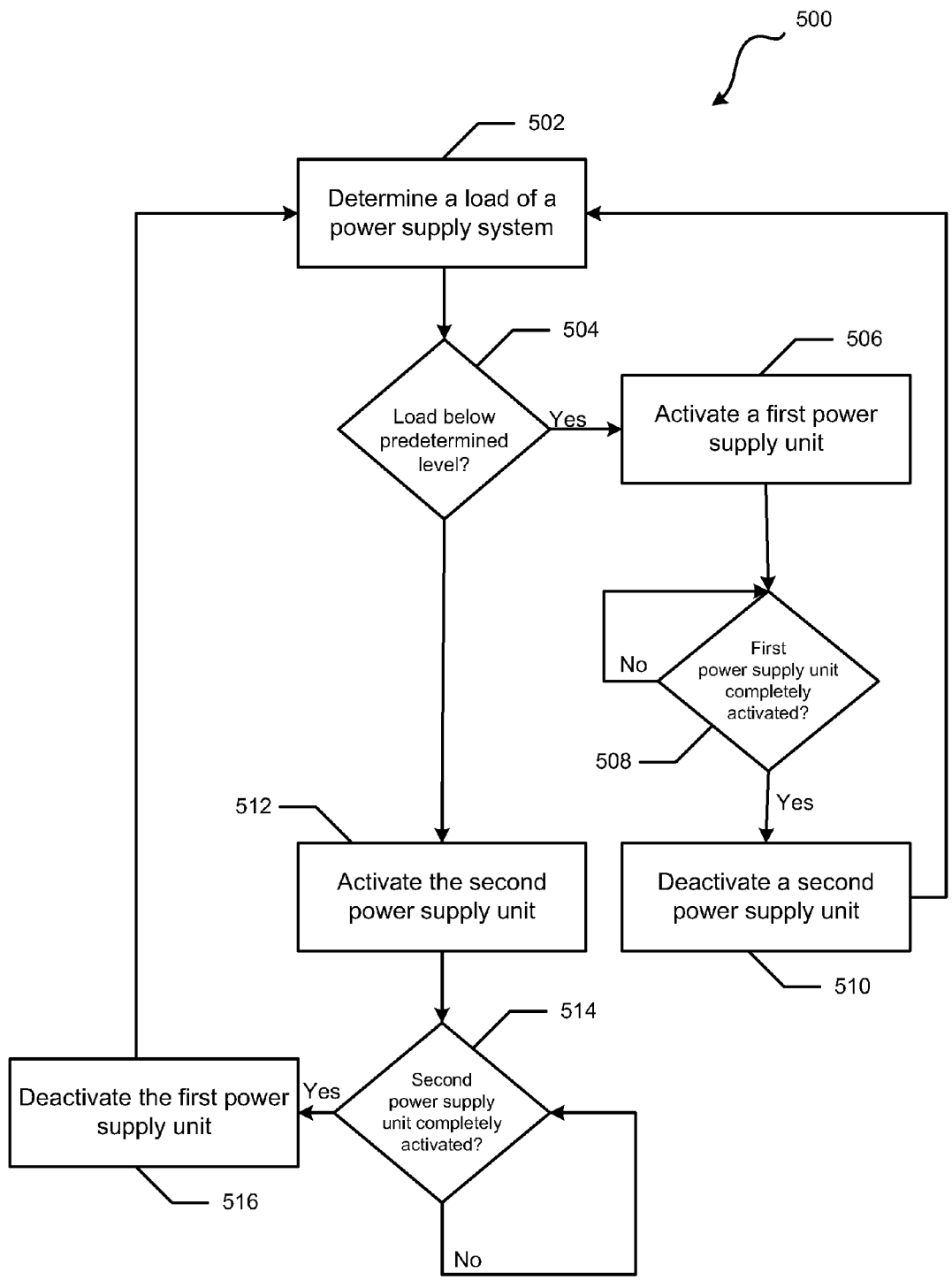
FIG. 5 is a flow diagram of a method for controlling multiple power supply units in the power supply system.

FIG. 5 shows a flow diagram of a method 500 for controlling a power supply system. At block 502, a load of the power supply system is determined. A determination is made whether the load is below a predetermined level at block 504. At block 506, if the load is below the predetermined level, a first power supply unit is activated. A determination is made whether the first power supply unit is completely activated at block 508. Upon the first power supply unit being completely activated, a second power supply unit is deactivated at block 510 and the flow diagram continues are stated above at block 502.

If the load is not below the predetermined level, then the second power supply unit is activated at block 512. At block 514, a determination is made whether the second power supply unit is completely activated. Upon the second power supply unit being completely activated the first power supply unit is deactivated at block 516 and the flow diagram continues as stated above at block 502.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power supply system for a server, the power supply system comprising:
   a first power supply unit in communication with an output, the first power supply unit adapted to activate if a load of the server connected to the power supply system is below a predetermined level, and adapted to deactivate if the load is above the predetermined level, wherein the first power supply unit is adapted to have a high efficiency at a light load;
   a first variable slope circuit adapted to receive information about the load applied to the first power supply unit and to deactivate the first power supply unit if the load is above the predetermined level;
   a second power supply unit in communication with the output, the second power supply unit adapted to activate if the load is above the predetermined level, and adapted to deactivate if the load is below the predetermined level, wherein the second power supply unit is adapted to have the high efficiency at a high load, wherein the first power supply unit and the second power supply unit are connected in a redundant mode configuration; and
   a second variable slope circuit connected to the first variable slope circuit, the second variable slope circuit adapted to receive information about the load applied to the second power supply unit and to deactivate the second power supply unit if the load is below the predetermined level.

2. The power supply system of claim 1 wherein the first power supply unit further comprises a current module coupled to the output, the current module adapted to determine the load applied to the power supply system.

3. The power supply system of claim 1 wherein the second power supply unit further comprises a current module coupled to an output, the current module adapted to determine the load applied to the power supply system.

4. The power supply system of claim 1 wherein the power supply system is adapted to have the high efficiency at all loads.

5. A power supply system for a server, the power supply system comprising:
   a first power supply unit in communication with an output, the first power supply unit adapted to activate if a load of the server connected to the power supply system is below a predetermined level, and adapted to deactivate if the load is above the predetermined level;
   a first current module coupled to the output, the first current module adapted to determine the load applied to the power supply system, wherein the first current module determines the load based on measuring an amount of current drawn by the server;
   a second power supply module in communication with the output, the second power supply unit adapted to activate if the load is above the predetermined level, and adapted to deactivate if the load is below the predetermined level, wherein the first power supply unit and the second power supply unit are connected in a redundant mode configuration; and
   a second current module coupled to the output, the second current module adapted to determine the load applied to the power supply system, wherein the second current module determines the load based on measuring the amount of current drawn by the server.

6. The power supply system of claim 5 further comprising:
   a controller and supervisor module in communication with the first power supply unit and the second power supply unit, the controller and supervisor module adapted to determine whether the first power supply unit and the second power supply unit are completely activated.

7. The power supply system of claim 6 wherein the controller and supervisor module is further adapted to prevent the first power supply unit from being deactivated until the second power supply unit is completely activated.

8. The power supply system of claim 6 wherein the controller and supervisor module is further adapted to prevent the second power supply unit from being deactivated until the first power supply unit is completely activated.

9. The power supply system of claim 5 wherein the power supply system is adapted to have a high efficiency at all loads.

10. The power supply system of claim 5 wherein the first power supply unit is adapted to have a high efficiency at a light load.

11. The power supply system of claim 5 wherein the second power supply unit is adapted to have a high efficiency at a high load.

12. A method for controlling a power supply system for a server, the method comprising:
    receiving a status signal from a current module indicating a load on the power supply system;
    if the load is below a predetermined level, activating a first power supply unit;
    if the load exceeds the predetermined level, activating a second power supply unit, and deactivating the first power supply unit only after the second power supply unit is fully activated; and
    maintaining a high efficiency at a light load based on activating the first power supply unit when the load is below the predetermined level, wherein the first power supply unit has a high efficiency at the light load, wherein the first power supply unit and the second power supply unit are connected in a redundant mode configuration.

13. The method of claim 12 further comprising:
    if the load is below a predetermined level, receiving a first control signal from a controller and supervisor module to activate the first power supply unit; and
    if the load exceeds the predetermined level, receiving a second control signal from the controller and supervisor module to activate the second power supply unit, and receiving a third control signal from the controller and supervisor module to deactivate the first power supply unit.

14. The method of claim 12 wherein both the first power supply unit and the second power supply unit are adapted to individually carry a full load on the power supply system.

15. The method of claim 12 wherein the power supply system is adapted to have a high efficiency at all loads.

16. The method of claim 12 wherein the first power supply unit and the second power supply unit are adapted to have different efficiency profiles.

17. The method of claim 12 wherein the second power supply unit is adapted to have a high efficiency at a high load.

* * * * *